(No Model.)

W. DORR.
CAR COUPLING.

No. 319,208. Patented June 2, 1885.

WITNESSES.
J. M. Hartnett
Henry B. Leach

INVENTOR.
Warren Dorr
By his Atty.
Henry W. Williams

UNITED STATES PATENT OFFICE.

WARREN DORR, OF GARDINER, MAINE.

CAR-COUPLING.

SPECIFICATION forming part of Letters Patent No. 319,208, dated June 2, 1885.

Application filed March 25, 1885. (No model.)

*To all whom it may concern:*

Be it known that I, WARREN DORR, of Gardiner, in the county of Kennebec and State of Maine, have invented a new and useful Improvement in Car-Couplings, of which the following is a specification.

Figure 1:
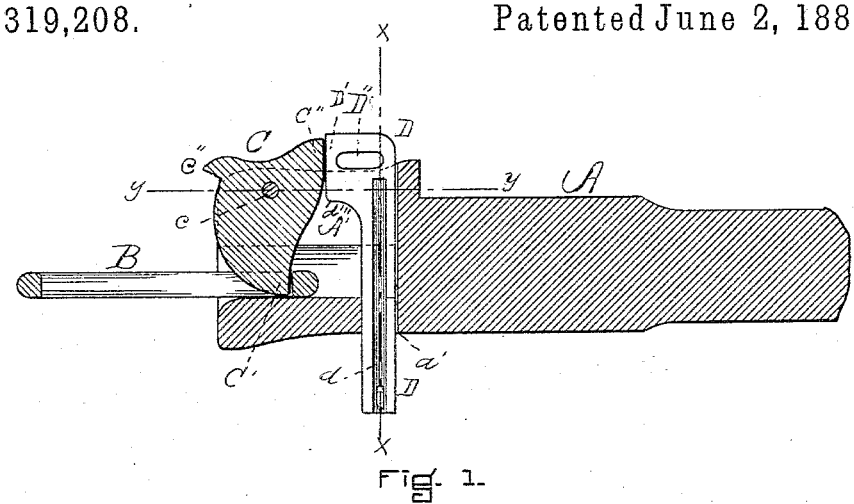
Figure 2:
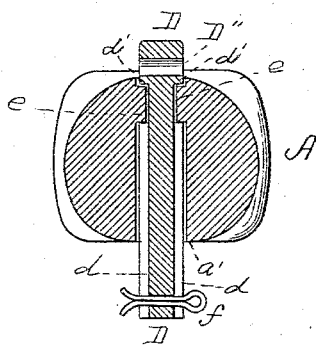
Figure 3:
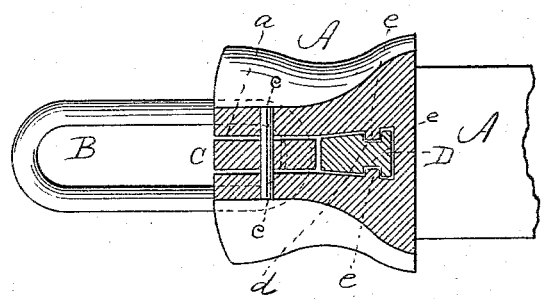
Figure 4:
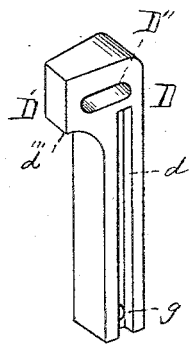

In the accompanying drawings, in which similar letters of reference indicate like parts, Figure 1 is a longitudinal vertical section of a car-coupling embodying my invention. Fig. 2 is a transverse vertical section on line $x\,x$, Fig. 1. Fig. 3 is a horizontal section on line $y\,y$, Fig. 1. Fig. 4 is a perspective view of the pin removed.

A represents the draw-head, provided with the longitudinal slot $a$, extending from the surface of said draw-head to the opening or mouth A' for the reception of the link B. An opening, $a'$, is made on the under side of the draw-head and connects with said mouth or chamber.

Horizontally swiveled or hung at $c$ in the chamber A' is the dog C, of the peculiar shape shown; and D is the pin, provided with the vertical face D' and horizontal opening D".

$d\,d$ are vertical grooves formed, on opposite sides of the pin D; and $e\,e$ are guides, extending from the draw-head into said grooves, so that as the pin is moved vertically it cannot tip forward. The pin is prevented from being withdrawn by means of a hook or crosspiece, $f$, placed in the horizontal opening $g$, near the lower end of the pin, and from dropping by the shoulders $d'$, which rest upon the guides $e$. When the link is in position, as shown in Figs. 1 and 3, it pulls against the lower portion C' of the dog, and the face or flat portion C" thereof bears against the face D' of the pin, where all the strain is had. While in this position the link is free to play and shake in the chamber without any possibility of its getting away from the dog, as both the dog and the pin are held in the position shown by gravity, and every pull upon the link tends to retain them more securely in such position.

To remove the link, the pin D is lifted by means of the opening D" until the portion $d'''$ is raised above the dog C, which, being then free to turn upon its pivot, allows the link to be withdrawn.

In order that the movement of the dog may be perfectly free said dog is made loose upon its pivot, and the pivot is loose in the draw-head. If desired, the dog may be tipped up forward until the ledge $c''$ thereon lies under the portion $d'''$ of the pin, so that the device may be prevented from coupling.

This device couples automatically, all that is required being to push the link into the chamber, and the dog will swing back to allow the link to pass under it, and then drop by gravity into the position shown in Fig. 1.

My coupler is strong, positive in its operation, and not liable to accidentally uncouple, besides being simple and inexpensive.

Having thus fully described my invention, what I claim, and desire to secure by Letters Patent, is—

1. In a car-coupling, the combination of the dog C, substantially of the shape shown, and provided with the face C", said dog being pivoted at $c$ in the draw-head, and the pin D, of substantially the shape shown, and provided with the face D' and shoulders $d'$, arranged and constructed to operate substantially as and for the purpose set forth.

2. The combination of the dog C, provided with the face C", and pivoted at $c$ in the draw-head, the pins D, provided with the face D' and grooves $d$, and the guides $e$, extending into said grooves from the draw-head, substantially as and for the purpose described.

3. The combination of the dog C, provided with the face C" and ledge $c''$, said dog being swiveled at $c$ in the draw-head, and the pin D D' $d'''$, substantially as and for the purpose described.

WARREN DORR.

Witnesses:
HENRY W. WILLIAMS,
J. M. HARTNETT.